US005485264A

United States Patent [19]
Chu et al.

[11] Patent Number: 5,485,264
[45] Date of Patent: Jan. 16, 1996

[54] HIGH DYNAMIC RANGE OTDR DATA ACQUISITION CIRCUIT

[75] Inventors: Ching Chu, Oakville; Mike VanderWindt, Hamilton, both of Canada

[73] Assignee: Antel Optronics, Inc., Burlington, Canada

[21] Appl. No.: 166,546

[22] Filed: Dec. 14, 1993

[51] Int. Cl.⁶ ............................................. G01N 21/88
[52] U.S. Cl. .................................................. 356/73.1
[58] Field of Search ........................................ 356/73.1

[56] References Cited

U.S. PATENT DOCUMENTS

| | | | |
|---|---|---|---|
| 4,421,979 | 12/1983 | Asawa et al. | 73/800 |
| 4,459,477 | 7/1984 | Asawa et al. | |
| 4,463,254 | 7/1984 | Asawa et al. | 250/231 R |
| 4,477,725 | 10/1984 | Asawa et al. | 250/231 R |
| 4,685,799 | 8/1987 | Brininstool | 356/73.1 |
| 4,794,249 | 12/1988 | Beckmann et al. | 356/73.1 |
| 4,804,264 | 2/1989 | Kirchhofer et al. | 356/44 |
| 4,812,038 | 3/1989 | Nazarathy et al. | 356/73.1 |
| 4,838,690 | 6/1989 | Buckland et al. | 356/73.1 |
| 4,875,772 | 10/1989 | Gentile | 356/73.1 |
| 4,928,232 | 5/1990 | Gentile | 364/525 |
| 4,952,057 | 8/1990 | Kamikawa et al. | 356/73.1 |
| 5,020,872 | 6/1991 | DuPuy et al. | 455/611 |
| 5,023,445 | 6/1991 | Goll et al. | 356/73.1 |
| 5,033,826 | 7/1991 | Kolner . | |
| 5,043,608 | 8/1991 | McDonald | 356/73.1 X |
| 5,062,704 | 11/1991 | Bateman | 356/73.1 |
| 5,067,810 | 11/1991 | Bu-Abbud | 356/73.1 |
| 5,069,544 | 12/1991 | Buerli | 356/73.1 |
| 5,072,111 | 12/1991 | Gilino | 356/73.1 |
| 5,082,368 | 1/1992 | Fuchs et al. | 356/73.1 |
| 5,093,568 | 3/1992 | Maycock | 250/227.14 |
| 5,113,277 | 5/1992 | Ozawa et al. | 359/127 |
| 5,123,732 | 6/1992 | Gross et al. | 356/73.1 |
| 5,129,722 | 7/1992 | Mader et al. | 356/73.1 |
| 5,137,351 | 8/1992 | So | 356/73.1 |
| 5,142,284 | 8/1992 | Trent et al. | 341/122 |
| 5,179,420 | 1/1993 | So et al. | 356/73.1 |
| 5,185,874 | 2/1993 | Trent et al. | 395/400 |

FOREIGN PATENT DOCUMENTS

WO93/023344 7/1992 WIPO .

*Primary Examiner*—Vincent P. McGraw
*Attorney, Agent, or Firm*—Davis Hoxie Faithfull & Hapgood

[57] ABSTRACT

An OTDR stores data samples in a predetermined sequence in a memory. Data is read from and written to the memory in the predetermined sequence by application of successive control signals. The stored data is read, added to a correlated sample of a new signal and the result stored to maintain the predetermined sequence of samples. Successive tests thus accumulate samples in sequence to provide an indication of the variation of the signal as the light pulse passes along the fiber under tests.

24 Claims, 4 Drawing Sheets

HIGH DYNAMIC RANGE OTDR DATA ACQUISITION CIRCUIT

The present invention relates to optical time domain reflectometers (OTDR).

OTDR's are used to determine the integrity of and locate faults in fibre optic cable. They operate by transmitting a light pulse from a laser along the fibre and monitoring the signal received at the same end of the fibre. The signal received will depend upon the Raleigh reflection or backscattering of the optical pulse and upon the attenuation of the optical pulse along the fibre. Assuming the fibre is faultless, a progressively decaying signal will be received over the period it takes for the pulse to traverse the fibre. If however, a fault exists in the fibre then a discontinuity in the signal will be displayed, either as a spike where the fault is reflective in nature or as a step where the fault is non-reflective such as, for example, dirt included in the weld between fibres.

OTDR's may be used to check fibres up to 200 km long and have proven extremely beneficial in locating faults within fibres. One commercially available unit that has proven extremely versatile is that sold by Antel optronics under the trade-name AOC. In this device the signal is sampled once per launch or firing of the laser and the sample recorded as an analogue signal on a capacitor. The timing of the gating of the sample may be varied from launch to launch so that the sample is collected at different distances along the fibre and the location of any discontinuity in the fibre can thus be located. This technique, however, while commercially successful, exhibits very low photonic utilization, that is the period during which the light pulse generated by the laser is sampled is short, and multiple firing of the light source is required to obtain the characteristic curve.

it has previously been proposed to sample the received signal periodically during each launch and store the samples individually. This provides an indication of the location of the fault in the fibre based upon the relative timing of the signals. As suggested in WO 93/02344 the sampling may be done with an A/D converter and the digital value stored in a memory. WO 93/02344 also suggests the possibility of repeating the launch several times and obtaining an average value of the received signal at each sample. The application contemplated in this document however does not require a high degree of accuracy for fault location, in the order of +/−0.25 km., and so the sampling rate is relatively low, in the order of 2.5 seconds. Accordingly, the storage and retrieval of data does not present a significant problem. This order of accuracy however is not acceptable in most applications where OTDR's are used.

The resolution of the fault location, that is the accuracy with which the location of the fault can be determined, depends in part upon the frequency at which the signal can be sampled. The lower the frequency, the longer the interval between the samples which correlates into greater distance along the fibre between samples. A sampling frequency of 50 Mhz for example provides a resolution of about 2 metres and interleaving of launches can improve the resolution still further.

As the sampling frequency increases, the manipulation of data becomes more demanding until it becomes the limiting factor. Previous proposals for storing and averaging data have utilised a software driven process controlled by a CPU. With such a procedure however the time taken to address the memory for reading data, writing data and performing arithmetic functions limits the sampling rate to below that required.

U.S. Pat. No. 5,185,874 to Trent discloses a data acquisition procedure that seeks to overcome this problem. Individual read and write addresses of the memory are computed from an initial address by incrementing the address by a predetermined address increment at each sample period. However, data flow is still controlled primarily by addresses thus requiring the intervention of an address recognition function. To maintain the resolution, the Trent patent proposes to interleave data samples on successive launches by incrementing the initial address. However, this arrangement requires multiple launches to acquire data at the required resolution and emphasises the need for accurate address recognition and processing.

It is therefore an object of the present invention to provide an OTDR that may sample the received signal at a high frequency and therefore offer higher photon utilization in a simple yet effective manner.

In general terms, therefore, the present invention provides an OTDR in which the successive data samples are stored in a memory in which the reading from the memory and writing to the memory is constrained to a predetermined sequence upon application of successive control signals. Accordingly, successive samples are retrieved and stored in a predefined sequence without the necessity for applying addresses to the data or examining addresses to retrieve the stored data. Application of a control signal, typically a clock pulse, will retrieve or store the next sample in the sequence allowing sampling to proceed at a high rate.

It is preferred that the memory is a FIFO and that the applied control signal is a clock pulse. It is also preferred that the memory is provided by a pair of individual memories each of which receives control signals to process successive samples. Access to the memories is under the control of a switch that alternates between the individual memories and thereby reduces the sample rate at each memory whilst retaining the overall high data rate. Each of the memories is constrained to process the received data in a controlled sequence so that control over the sequencing of the data samples is maintained.

An embodiment of the invention will now be described by way of example only with reference to the accompanying drawings in which FIG. 1 is a schematic representation of an optical time domain reflectometer;

Figure 1:
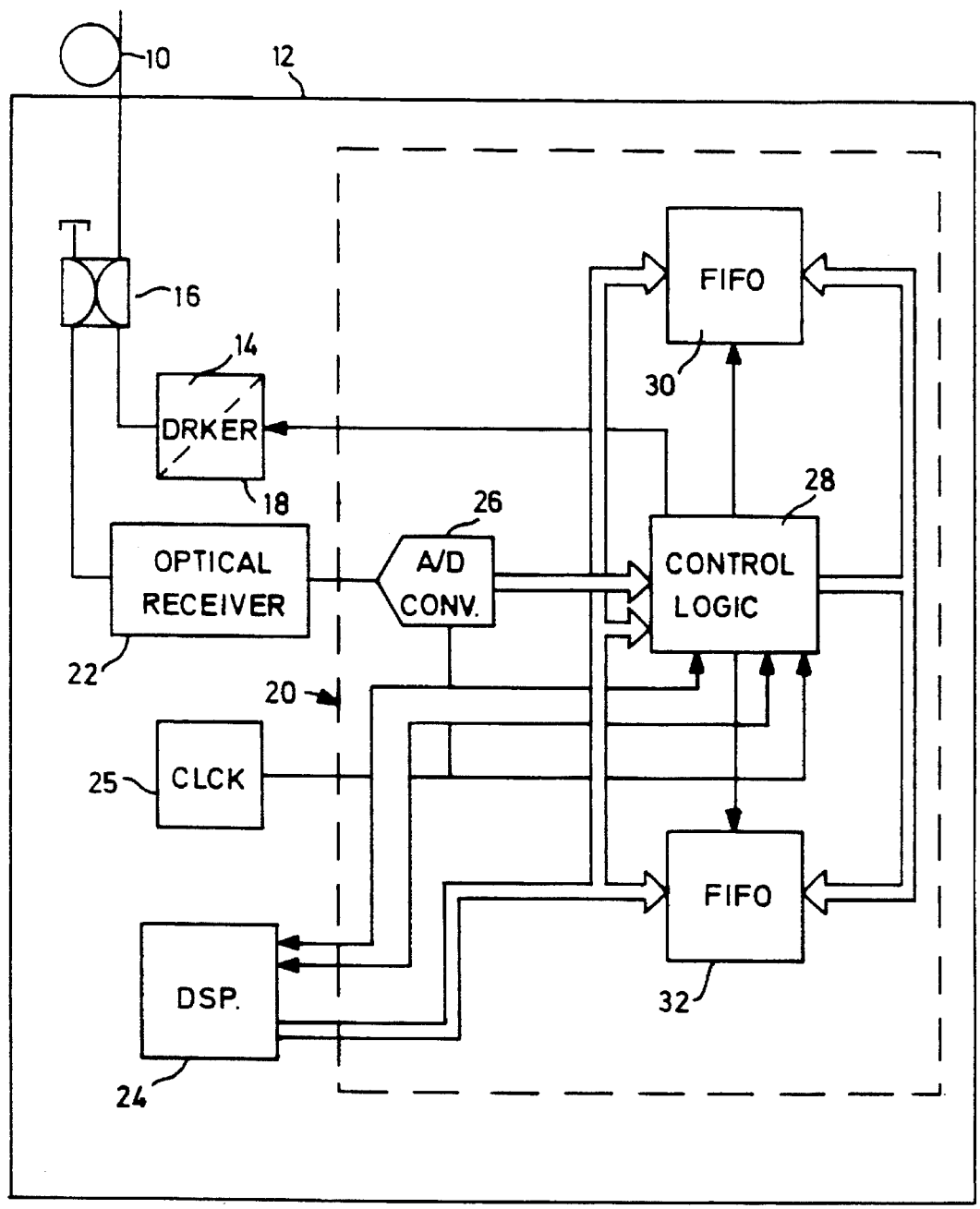

Referring therefore to FIG. 1, an optic fibre indicated at 10 is interrogated by an OTDR generally indicated at 12. The OTDR includes a light source in the form of a laser 14 connected through a beam splitter 16 to the fibre 10. The laser 14 is driven by drive circuit is from a data acquisition circuit 20. Signals from the fibre are received through the beam splitter 16 into an optical transducer 22 and transferred as an analogue electrical signal to the data acquisition circuit 20.

Circuit 20 is used to initiate interrogation of the fibre 16, process the signal received from the fibre and store the data for further processing. The data acquisition circuit 20 is controlled by a data signal processor (DSP) 24 which establishes initial conditions in the circuit 20 as a result of external input from the operator and allows collected data to be extracted.

The data acquisition circuit 20 is controlled by an external clock 25 operating at 50 Mhz and includes an analogue to digital (A/D) converter 26 to receive the signal from the transducer 22 and sample it at the clock speed. The A/D converter 26 is connected to a control logic module 28 which controls the operation of the laser driver 18 and the reading of data to and the writing of data from a pair of FIFO memories 30,32.

Each of the FIFO memories 30, 32 stores data sequentially in an array of memory registers and reads data sequentially from those registers upon receipt of successive read signals. The FIFO memories 30, 32 therefore retain data in the sequence in which it is received and read data from the memories 30,32 in a corresponding sequence.

The FIFO memories 30, 32 are commercially available units such as those available from Cypress Semiconductor under product number CY7C464 and will be described in further detail below with reference to FIG. 4. Each of the memories 30,32 has an operating speed of 33 Mhz and is formed from a plurality of modules to provide a 32k×18 bit data array.

Figure 2:
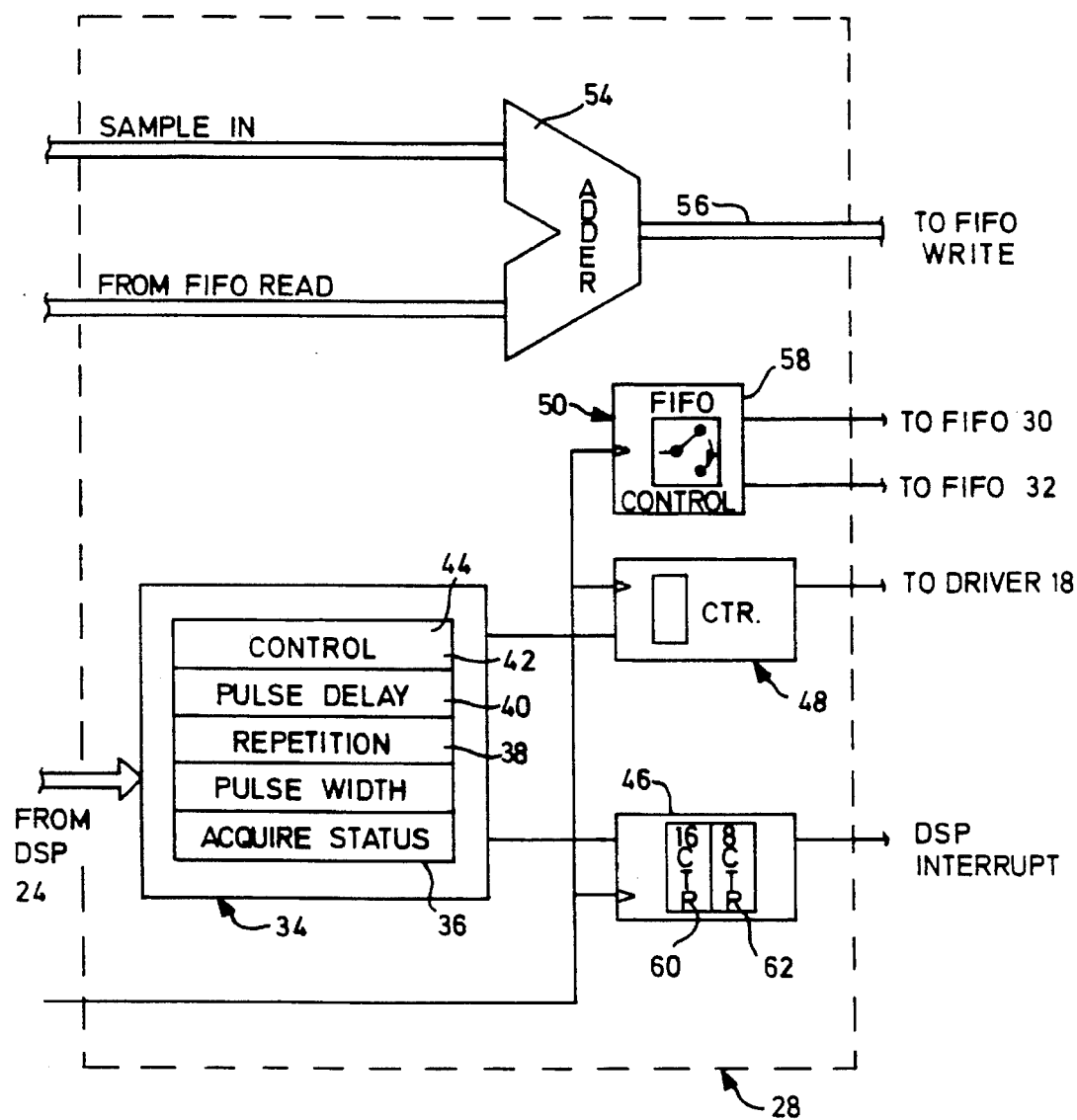
FIG. 2 is a schematic of a control logic module used in the embodiment of FIG. 1.

The control logic module 28 is shown in more detail in FIG. 2. The module 28 includes a bank of control and status registers, indicated collectively at 34, each of which controls a different function. The registers in the bank 34 are addressed by the DSP 24 through a data bus 35 to set initial conditions in the register bank 34 and report to the DSP 24 upon completion of the test.

The bank 34 includes an acquire status register 36 which contains error flags, and keeps a record of the number of times that the laser 14 has been fired; a pulse width register 38 which contains a value indicative of the width of the pulse to be generated by the laser, that is the period of time in which the laser 14 is energised by the laser driver 18; a repetition register 40 which contains a value that determines the number of samples that will be taken for each launch; a pulse delay register 42 which contains a value indicating the delay between start of the sampling and launching of the laser 14 and a control register 44 that is used to control the individual laser selection and associated circuitry.

The control logic module 28 also contains an acquisition control module 46, a pulse generating module 48 and a FIFO controller 50, each of which is clocked from the external 50 Mhz clock 25.

The output from the A/D converter 26 is directed through an input 52 to a multistage pipeline adder 54 in the data acquisition circuit 20 which also receives data read from the FIFOs 30,32 through input 53. The adder 54 sums the two inputs, and delivers the result through an output 56 to a register within the FIFOs 30,32. Selection of data from the FIFOs 30,32 is under the control of FIFO controller 50 which includes a bistable switch 58 to address alternate FIFOs at each clock pulse through control lines 51a,51b respectively.

Figure 3:
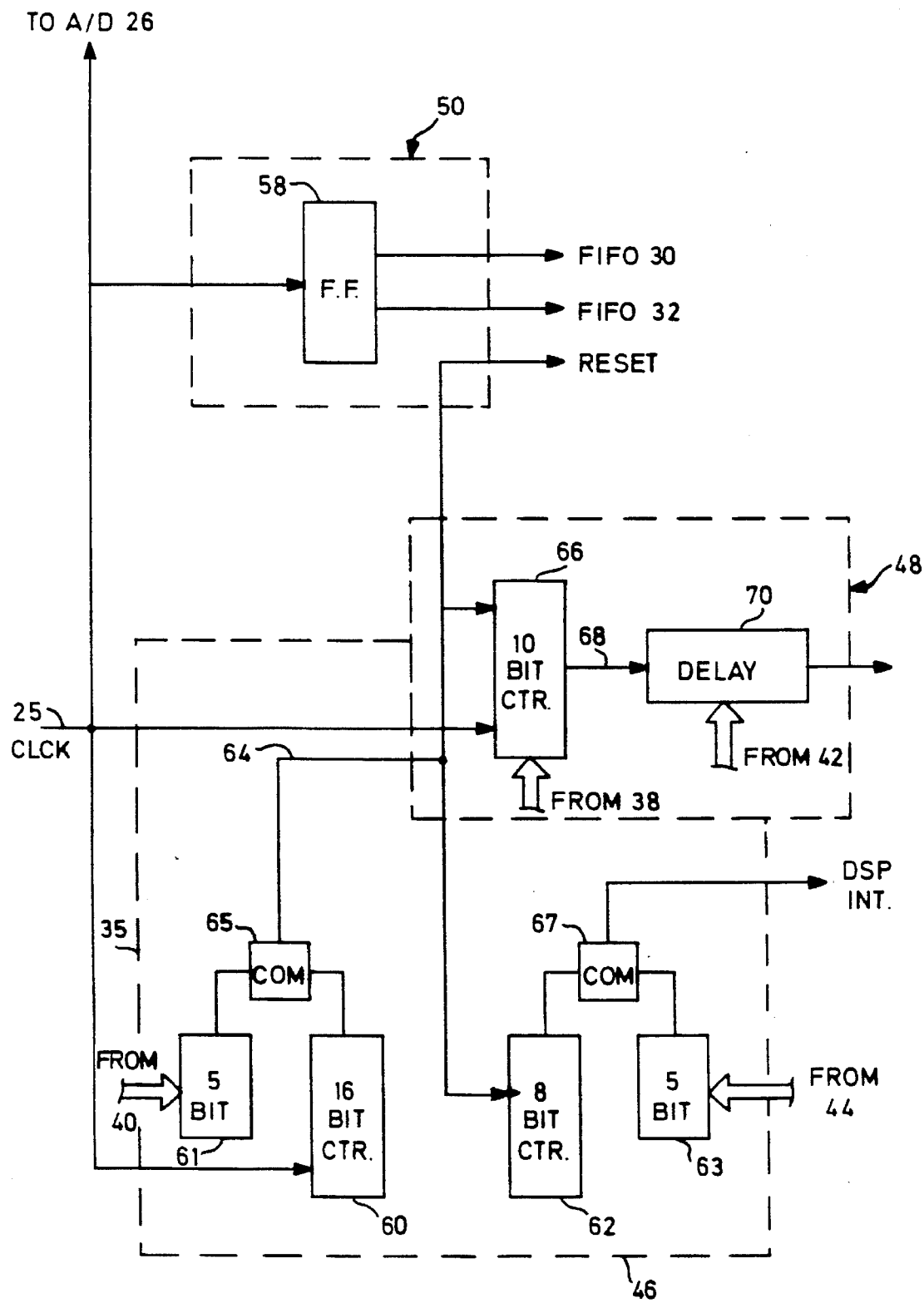
FIG. 3 is a further schematic showing further details of the circuit of FIG. 2.

The acquisition control module 46, pulse generator module 48 and FIFO controller 50 and their inter-relationship is shown in further detail in FIG. 3.

The acquisition control module 46 includes a pair of counters 60,62 each of which has a 5 bit register 61,63 associated with it. The counter 60 is a 16 bit register and is incremented by clock 25 at each sample to provide a maximum of 64k samples at each launch. As the frequency of the samples is determined by the frequency of the clock 25, the number of samples selected is determined by the length of the fibre under test.

The register 61 is loaded from the register 40 with a value corresponding to the 5 most significant digits of the number of samples to be taken. A comparator 65 compares the register 61 with the count in the five most significant digits of counter 60 and when they are equal provides a carry signal 64.

The carry signal 64 is applied to the clock input of counter 62 so that the count in counter 62 is incremented for each full count of register 60. The register 63 is loaded with the contents of control register 44 to determine the number of launches per test and through a comparator 67 generates an output signal 65 when the 5 most significant digits of the counter 62 correspond to the contents of register 63. The signal 65 is used as an interrupt to the DSP 24 to indicate the completion of the test.

The pulse generating module 48 includes a 10 bit counter 66 which is loaded with the contents of pulse width register 38. The counter 66 is clocked by the clock 52 and initiates countdown upon receipt of the output signal 64 from comparator 65. A control signal 68 to operate the laser 16 is generated by the counter 66 during countdown and is fed to a programmable delay unit 70. The unit 70 receives the contents from the pulse delay register 44 and determines the required delay before passing the control signal to the driver 18.

The carry signal 64 generated by comparator 65 is also applied to the FIFOs 30,32 to reset the read/write pointer of each of the FIFOs at the initial data register.

Figure 4:
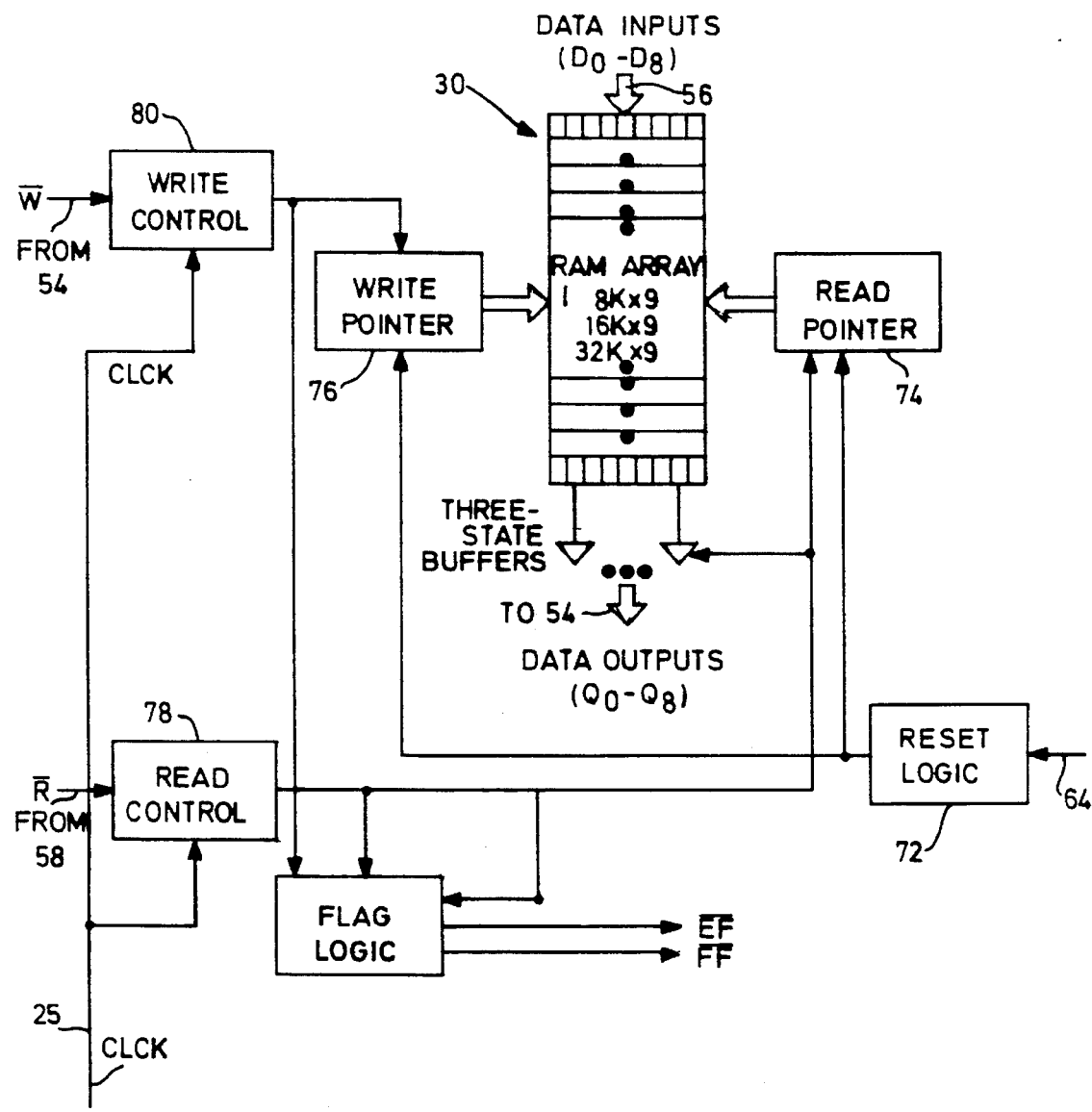
FIG. 4 is a logic block diagram of a memory used in the embodiment of FIG. 1.

As may be seen in FIG. 4, the carry signal 64 is applied to reset logic 72 to reset the read pointer 74 and write pointer 76. Read pointer 74 is incremented under the operation of a read control 78 by application of the output of switch 58 and initialised by carry signal 64.

The write pointer 76 is incremented under the operation of write control 80 which writes data to the FIFO 30,32 upon application of the clock signal from switch 58. The write pointer 76 is offset from the read pointer 74 by the difference between the number of "WRITE" and "READ" operations but initially both pointers are at the same location. After initialization, which will be described below, both the read pointer 74 and write pointer 76 will increment through data registers the FIFO memory 30,32 at each applied clock pulse to read and write data in a predetermined sequence.

In operation therefor, the initial conditions are set in the register bank 34 from the DSP 24 based on the length of fibre to be tested (number of samples), the attenuation characteristics of the fibre (the pulse width), and the delay required before launch of laser 14 to initialize the sampling process.

Upon start of a test, the values set by the DSP 24 are loaded into the respective registers 36 through 44 in the register bank 34. The registers 61,63 associated with counters 60, 62 and counter 66 are loaded from their respective registers. For the first launch of the laser 18, the counter 62 is empty and this condition is used to inhibit operation of the read control 78 while the first set of samples are obtained. At the same time, the signal from the transducer 22 is sampled by the A to D converter 26 and applied to the adder 54 through input 52. The signal at input 53 is held at zero for the first launch so that the output of adder 54 represents the sample value. The samples are presented to the output 56 in sequence and directed to alternate ones of the FIFOs 30,32 by the bistable switch 58 where they are written in sequence. In the embodiment, adder 54 is a seven-stage pipeline adder. Accordingly, the write control 80 of each FIFO is initially inhibited by a counter for the clock pulses necessary to fill the adder 54 and the write control 80 enabled when the first sample is available at the outputs 56.

Thereafter, the samples will be written in sequence to the FIFOs at each clock pulse. At the next clock pulse, the bistable switch 58 accesses the FIFO 32 through control line 51b and extracts the corresponding data from its initial register for application to the adder 54. Successive samples are thus extracted from alternative FIFOs 30,32 in sequence.

The adder 54 proceeds to sum the two signals and produce the result on the output 56. During this period, the write pointer 76 is maintained at the initial location in each of FIFOs 30,32. Upon summed data being generated at the output 56, the write control is enabled and the summed data is written to the data register from which the data was extracted. Thereafter, one of the write pointers 76 of FIFOs 30,32 is incremented at each clock cycle to write data in the same sequence and location from which it was extracted.

The initiation of the test also increments the counter 60 at each clock pulse and initiates the operation of the 10-bit register 66 to determine the pulse width of the laser. The delay unit 70 passes the pulse from the counter 66 as determined by the contents of the pulse delay register 42 and switches on the laser 14 through the drive 18. The pulse is thus transmitted through the fibre 16 and the reflected signal received at the transducer 22. At each clock pulse, the receive signal is sampled and presented to one input of adder 54.

After the requisite number of samples have been taken as determined by register 61, the carry signal 64 initiates the next launch of the laser 14. The carry signal 64 also increments the counter 62 which releases the read control 78. At this time, the write pointer 76 is offset from the read pointer 74 by the number of samples. The bistable switch 58 is also conditioned to its initial condition so that upon application of the first clock pulse, the contents of the initial data register in the FIFO 30 are read first. This is presented to the input 53 of the adder 54 and the first sample of the signal applied to the input 52. The adder 54 combines the signals to provide an accumulation of the samples at the output 56. The write control 80 has been inhibited while the adder 54 processes the first sample but during this time a number of samples have been read. The write pointer follows the difference between the write and read apparatus and so remains at the next available data location. Upon release of the write control 80, the sample is written to the next available data location and successive samples stored in the predetermined sequence until the counter 60 again indicates the requisite number of samples have been taken. At this time, the initial data samples have progressed to the reset location of the read pointer. The carry signal 64 therefore resets the FIFOs to the read pointer 74 with the first data sample so that at the next launch, the accumulated data will again be combined with a sample from a corresponding location on the fibre. This is achieved without the need to address each sample.

At each launch, the counter 62 is incremented and launches continue until its count corresponds to the register 63 and an interrupt signal is sent to the DSP 24. At that time, the data registers in FIFOs 30,32 contain the accumulation of samples at each location along the fibre.

It will be appreciated that the control over the read and write pointers 74,76 and the operation of the FIFOs 30,32 ensures that corresponding samples from successive launches are accumulated in sequence in the FIFOs 30,32. Accordingly, after a number of launches as determined by the register 63, the FIFOs 30,32 will contain the accumulated data for all of the samples. The data will be correlated by its order in the FIFO to a position along the fibre and accordingly any discontinuities in the data can be used to identify a fault or abnormality in the fibre.

The adder 54 is a pipeline adder as noted above to facilitate processing of the two datastreams. In the preferred embodiment, a seven-stage pipeline adder is utilized and to facilitate accumulation of plural samples of the data, it is preferred that the FIFO 30,32 are 18-bit data arrays although the A to D converter 26 produces a 10-bit sample.

The provision of the bistable switch 58 permits each of the FIFOs to be operated at half the clock speed—that is, 25 Mhz—and thereby permits the processing of the data in an orderly manner.

It will be seen therefore that the OTDR provides assimilation of the data at a high sample rate giving a resolution in the order of 2 metres when operating at 50 Mhz. Moreover, the multiple sampling during each launch produces a high photon utilization and the accumulation of the data by successive additions facilitates recognition of the discontinuities.

Similarly, the use of FIFOs minimizes the control functions necessary to extract and store data in sequence and avoids the delays inherent in reading and writing to addressable CPUs. Again, this enhances the acquisition of data at a high data rate.

We claim:

1. An OTDR to conduct a test on optic fibre by passing a light pulse along the fibre and monitoring the signal reflects; said OTDR comprising a switchable light source to generate an optical pulse upon application of an enabling signal thereto, a receiver to receive a signal reflected from said fibre, an analog to digital converter to sample periodically said received signal during an interrogation period associated with each of said light pulses and provide during each interrogation period a plurality of digitized samples of the received signal with each of said samples corresponding to a particular location along said fibre, a memory to store said samples to provide an indication of the variation of said reflected signal as said light pulse passes along said fibre, said memory having a plurality of storage locations to receive and store individual ones of said digitized samples and having a control associated therewith to generate successive control signal each control signal being operable (to store said samples) upon said memory to access a next one of said locations in a predetermined sequence within said memory and a reset signal generator to apply said enabling signal to said light source and to reset said control to access an initial one of said storage locations in said predetermined sequence and thereby permit repetitive storage of samples in said predetermined sequence in said memory.

2. An OTDR according to claim 1 wherein said control signal is generated prior to operation of said light source.

3. An OTDR according to claim 1 wherein said control is operable to extract a sample from one of said locations upon application of said control signal whereby said samples are read from said memory in said predetermined sequence upon application of said successive control signals.

4. An OTDR according to claim 3 including an accumulator to receive a sample from said analogue to digital converter and a correlated sample stored in said memory during a previous launch of said light source and to combine said samples to provide an accumulated sample, said control being operable to store said accumulated samples sequentially in said memory.

5. An OTDR according to claim 4 wherein said memory includes a pair of memory modules and a switch to alternate access to said memory modules whereby successive samples are extracted from alternate modules.

6. An OTDR according to claim 4 including a counter to determine the number of samples to be taken for each launch of said light source, said counter being operable upon attainment of said number to enable said reset signal generator.

7. An OTDR according to claim 6 wherein said memory includes a pair of memory modules and a switch to alternate access to said memory modules whereby successive samples are extracted from alternate modules.

8. An OTDR according to claim 6 wherein a delay is provided to inhibit operation of said light source after receipt of said reset signal for a predetermined period.

9. An OTDR according to claim 8 wherein said period is adjustable.

10. An OTDR according to claim 6 wherein said light source is enabled for a predetermined period by receipt of said reset signal.

11. An OTDR according to claim 10 wherein said predetermined period is adjustable.

12. An OTDR according to claim 6 wherein each reset signal is monitored and interrogation of said fibre by said OTDR is terminated after a preset number of reset signals.

13. An OTDR according to claim 6 wherein said preset number is adjustable.

14. An OTDR according to claim 13 wherein said reset signals are accumulated by a counter and interrogation of said fibre by said OTDR is terminated when said counter attains said preset number.

15. An OTDR according to claim 4 wherein said memory includes a read control to extract data sequentially from said memory and a write control to store data sequentially in said memory, said read control being initiated by said reset signal and said write control being initiated by receipt of said accumulated sample.

16. An OTDR according to claim 15 wherein said read control is incremented sequentially by application of clock signals thereto.

17. An OTDR according to claim 16 wherein said memory includes a pair of memory modules and a switch to alternate access to said modules whereby successive samples are read from alternate modules.

18. An OTDR according to claim 17 wherein said memory is a FIFO.

19. An OTDR according to claim 18 wherein said switch applies successive clock signals to alternate ones of said modules to operate said read control and said write control.

20. An ODTR according to claim 15 wherein said memory is a FIFO and said read control is inhibited during the interrogation period associated with an initial enablement of said light source in said test, said accumulated samples stored in said memory by said write control therefore corresponding to the samples obtained by said analog to digital converter during such interrogation.

21. An OTDR according to claim 20 wherein said write control monitors the difference between the number of times data is written to said memory and read from said memory to determine the location at which said accumulated samples are written.

22. An ODTR according to claim 21 wherein said write control is inhibited after said reset signal to permit processing of an initial sample read from said memory by said accumulator.

23. An OTDR according to claim 22 wherein operation of said read control during said interrogation period associated with said initial entablement of said light source is inhibited by a counter operable to store said reset signals and is enabled upon said counter obtaining a predetermined value.

24. An OTDR according to claim 23 wherein interrogation of said fibre is terminated when said counter attains a preset number.

* * * * *